United States Patent Office 3,450,279
Patented June 17, 1969

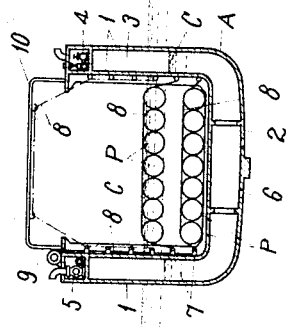
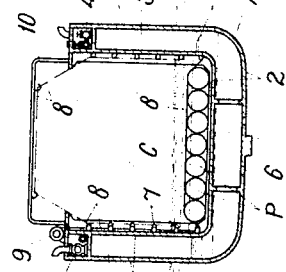
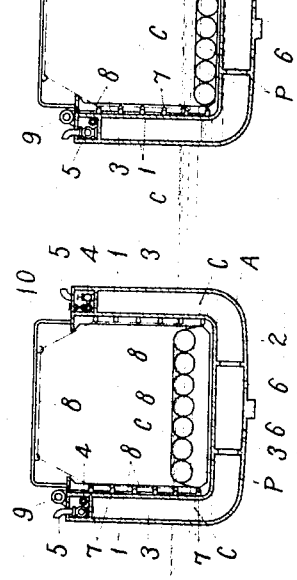
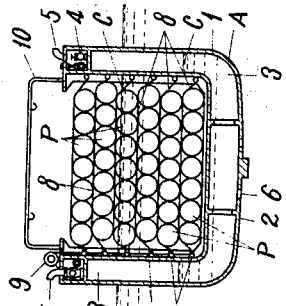
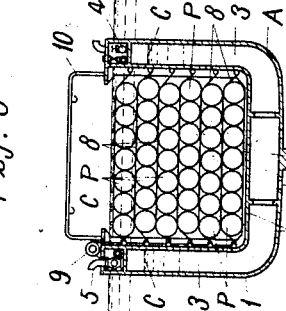
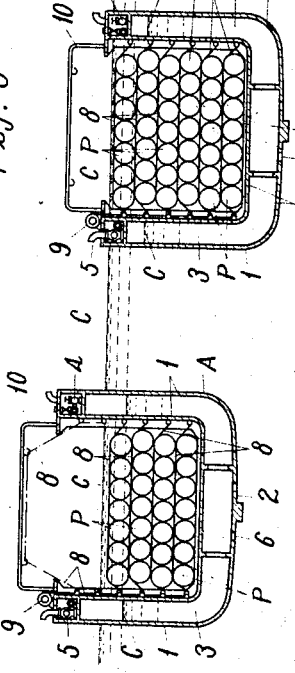

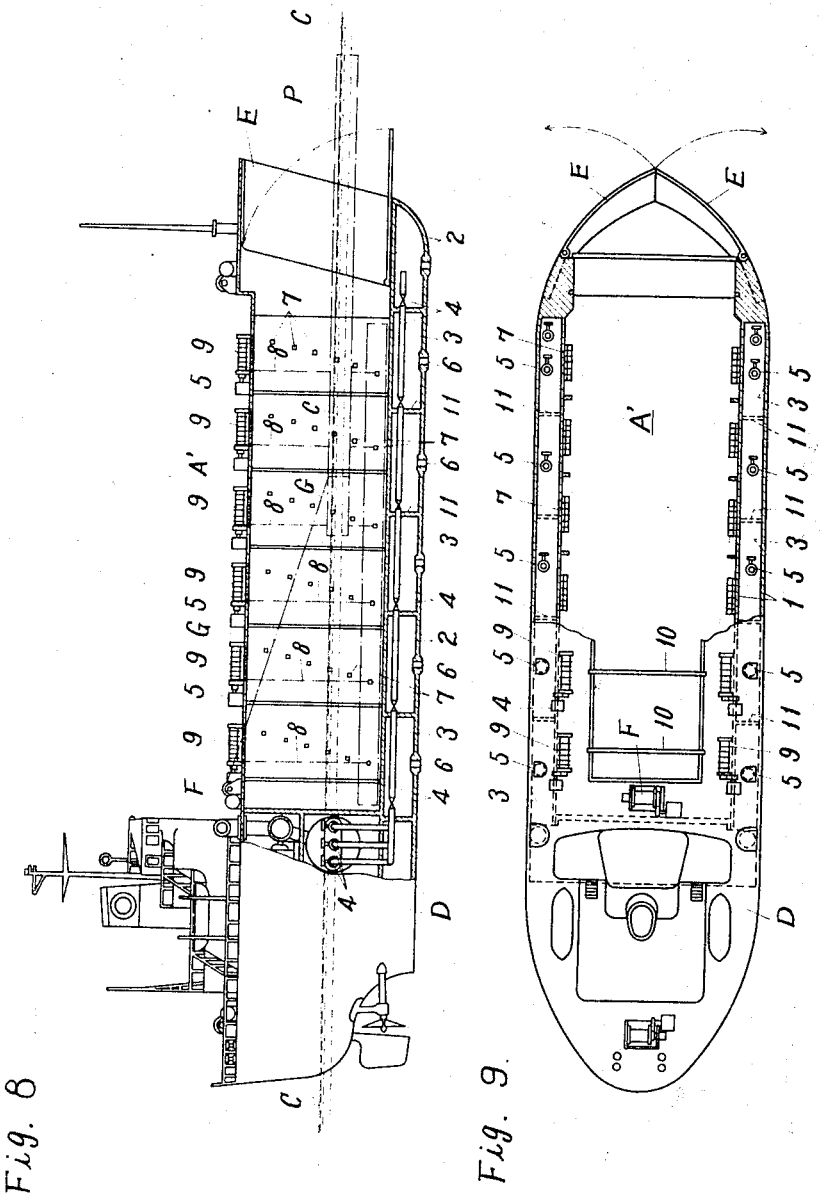

3,450,279
METHOD FOR TRANSPORTING TIMBERS BY SEA
Shinichi Yukawa, 312 Uenoshibacho 1-cho, Sakai, Osaka, Japan
Filed July 14, 1967, Ser. No. 653,467
Claims priority, application Japan, July 22, 1966, 41/48,073
Int. Cl. B65g; B63b 27/00
U.S. Cl. 214—152                     2 Claims

ABSTRACT OF THE DISCLOSURE

A floating vessel is open on at least one end so that water internally and externally of the vessel are in communication. A raft of timbers is floated into the vessel and secured thereto. The vessel is forced down further in the water and a second raft is floated in over the first raft and secured to the vessel. The vessel then carries its load to a destintaion where it is unloaded in the reverse manner.

---

This invention relates to a method for transporting timbers by water, including loading and unloading, and more particularly, this invention has for an object to provide a unique method for such purposes, whereby timbers are loaded and carried in the form of raft in an ark or a floatable transporting casing and unloaded in the same state of raft, thus greatly reducing the loading and unloading work involved in water carriage of timbers. The reduction of labor achieved by means of the present invention is not confined to loading and unloading work only but may be extended advantageously to small-lot water carriage work subsequent to unloading.

In the known method of transporting timbers by water, timbers are first made into rafts with a great deal of labor but since timbers are carried on an ordinarily type of freighter for sea transportation, rafts of timbers had to be broken down again into separate timbers with a great deal of labor and time, whereupon the timbers were loaded on board by a crane or other suitable loading means and piled up piece by piece. After unloading the timbers at the port of destination for further transportation in small lots, they had to be remade into rafts again with further labor and time. The loss of time and labor involved in this work has been quite extensive.

In the present invention, transportation of timbers by water covers transportation by every kind of water carriage, including marine, river and lake transports. In this concept, the term "sea-water" referred to in the following description applies also to river water and lake water. Also, an ark or a floatable casing in the present invention includes both an ark having no propelling equipment to navigate of itself and an ark which is combined into a ship having propelling equipment for self-navigation.

The nature and further advantages of the present invention will be readily apparent from the following description made with reference to the accompanying drawings, in which:

FIGS. 1 to 7 represent embodiments in the present invention in which an ark having no propelling equipment is used, FIG. 1 being a perspective view partly in section, of an ark or a floatable casing in accordance with the present invention, and FIGS. 2 to 7 being front views in vertical section of the casing illustrated in FIG. 1, showing the sequence of loading timbers into the ark.

FIGS. 8 and 9 represent respectively modified embodiments of the present invention in which a ship having a propelling equipment is used, FIG. 8 being a side view, partly in vertical section, of the ship, and FIG. 9 being a plan view, partly in transverse section, of the ship illustrated in FIG. 8.

Figure 1:
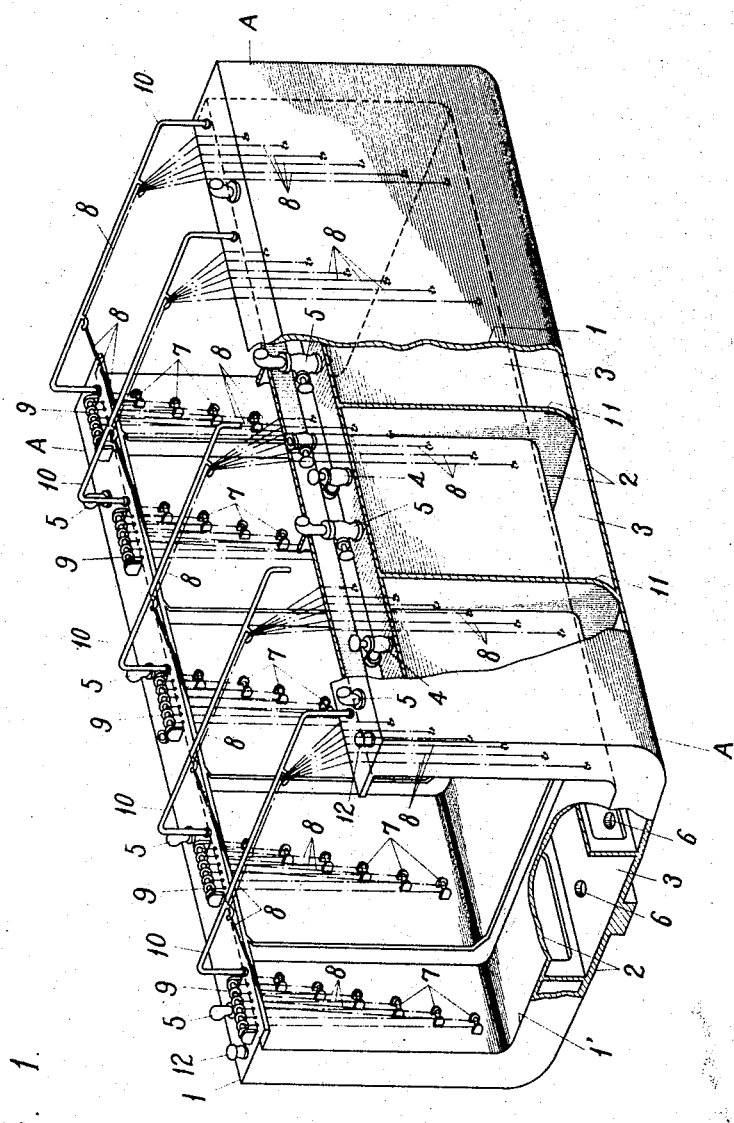

Referring to the method of loading timbers in accordance with one embodiment of the present invention in which an ark or a floatable casing having no propelling equipment is used, the ark A is openable at least at the front side 1' thereof, to provide a gateway for cargo. The ark A is provided with an air chamber 3 composed of double walls extending over opposed side portions 1, 1 and a bottom portion 2. Provided at the upper part of the ark A are a feed valve 4 which feeds the air from an air pump (not shown in the drawing) and an exhaust valve 5, while a water passage 6 is provided at the outer wall of the bottom portion. Under these arrangements, as the air inside the air chamber 3 is discharged by means of the exhaust valve 5, the sea-water enters into the air chamber through the water passage 6 at the bottom, whereby the ark is caused to draw deeper in the water. On the contrary, when the air is forced in by means of the feed valve 4, the sea-water inside the air chamber 3 is forced out of the water passage, causing the ark to draw lighter.

Inside the ark A, several sets of tightening ropes 8, each set comprising several ends of rope, are provided with a predetermined space in between, each set of ropes being wound at its one end to a tightening frame 9 through one of the pulleys 7 provided on the side wall 1 of the ark and secured at its base end to the other side wall 1. These sets of ropes 8 are arranged in two or more tiers according to the capacity of the ark. In the drawing, the numeral 10 denotes a beam which connects the opposed side walls 1, 1 at the upper part, 11 denotes partition walls which divide the air chamber 3 into several sections and 12 denotes bitts to which towing ropes are wound.

Referring now to the sequence and method of loading rafts of timbers one by one into the transporting ark of the above construction and piling them up there, the air inside the air chamber 3 is first adjusted to make the ark draw deeper by the desired amount by manipulating the feed and exhaust valves 4, 5 respectively. By this adjustment, the depth of the sea-water which enters into the ark, i.e., the depth of the water accumulating on the upper surface of the bottom wall, becomes large enough to allow one raft of timbers to be loaded into the ark in a floating state.

When the ark A draws deeper in this way, the surface of the water inside the ark is levelled with the surface of the sea, with the result that both have buoyancy in common between them. By utilizing this buoyancy of water C common to both, a first raft of timbers P is slid into the ark A. In this case, as the tightening ropes 8 stand in the way of drawing-in of the raft, they are all pushed up to the upper part of the ark. The raft thus drawn in is pressed down and held in position by a set of wire ropes 8 provided at the lowermost tier, which is tightened by means of the tightening frame 9. The raft is bound to the bottom of the ark with the ropes 8, as will be seen in FIG. 2 and FIG. 3.

When the loading of the first raft is completed, the ark A is made to draw deeper by another tier by manipulating the exhaust valve 5. The second raft is similarly slid into the ark A by utilizing the buoyancy of the water C spreading over inside and outside of the ark, pushed down onto the first raft by means of the rope 8 in the second tier from the bottom and is bound there, as shown in FIG. 4. This method of loading is repeated for the third, fourth and succeeding rafts until rafts of timbers of the desired number are piled up in the ark A as shown in FIG. 5 and FIG. 6.

When the loading work is completed, the loaded ark A is made to draw lighter by forcing the air into the air chamber 3 from the feed valve 4 until, as shown in FIG. 7, it draws light enough to be suitable for towing and then it is towed on the water by a tugboat towards its destination. In this case, it is possible to tow several arks A in a row.

When unloading the cargo upon arrival at its destination, the work is done in a manner and a sequence reverse to the aforementioned case of loading, in which, with the fastened wire ropes being loosened step by step, the rafts of timbers are discharged from the ark one by one, beginning with a raft in the top tier. This work of discharging the rafts is of course to be carried out by utilization of the buoyancy of the water pervading freely over both the inside and outside of the chamber 3 as in the aforementioned case of the loading work, and it is likewise necessary for that purpose to adjust the amount of air in the air chamber 3 in order that the ark may draw deeper or lighter.

Referring to a modified embodiment of this invention, in which a vessel D equipped with propelling equipment is used instead of the ark A, there is no fundamental difference in the loading and unloading method between the two cases. In the latter embodiment, the hull A' of the ship D is utilized as an ark, and since the hull A' is normally closed air-tight by the side walls which form the hull, it is necessary to cut out one of the side walls at the bow portion of the vessel in order to provide a gateway which is openable with doors E and through which the sea-water is taken into the hull A' to lead the rafts in by means of towing ropes G of a winch F. The doors E are closed on completion of loading of the rafts.

As may already have been understood from the foregoing explanations with reference to FIGS. 2 to 7, the method and sequence of operation in the case of utilizing the hull A' of the ship D as an ark are the same as in the case of using the ark A, that is, an air chamber 3 is likewise provided in the hull A', and the drawing deeper or lighter of the ship D is effected by adjusting the amount of air inside the chamber, and on the other hand, by utilizing the buoyancy of water C commonly acting on both the inside and outside of the hull A', the rafts are drawn into the hull, whereupon the rafts are pressed down under water and fastened there by ropes, and by repeating this operation, they are piled up one by one in the hull.

Regarding the method of making the ark A draw deeper step by step for the loading work, it may be considered that instead of the aforementioned method whereby the amount of air inside the air chamber 3 is adjusted by the manipulation of the feed valve 4 and/or the exhaust valve 5 provided at the upper part of said air chamber 3, an adjusting valve (not shown in the drawings) is provided in the water passage 6 at the bottom part of the ark in place of the valves 4 and 5 to allow the desired amount of sea-water to enter the chamber 3. In this case, when floating the ark, the sea-water in the air chamber 3 will be pumped out of the chamber by means of a pump.

It is a well-known fact that making a raft of timbers is work that requires a great deal of time and labor. However, in the conventional method of transporting timbers by water, timbers are loaded on an ordinary type of freighter for sea transportation and therefore, the timbers which were once made into rafts have to be untied into separate timbers with a great deal of time and labor, and then carried on board by a crane or other loading means and piled up there piece by piece. Since the timbers are separated into pieces and piled up on board, they have to be remade into rafts again with further time and labor for small-lot transportation, after unloading at the destination. The loss of time and labor involved in this work has been very great.

As aforementioned, this invention provides a unique method and equipment which permits the timbers to be loaded and piled up on board in the state or raft, unloaded in the state of raft and transported in small lots in the state of raft. This invention provides a method of loading and unloading rafts of timbers entirely by utilization of the buoyancy of water pervading both inside and outside of an ark or ship, thus not only introducing an entirely new concept in water transportation of timbers, including loading and unloading work, but also making a great contribution to the saving of labor and time required for loading and unloading work.

Having thus described the nature of the present invention, what I claim herein is as follows:

1. A method of loading timbers for transportation thereof by water comprising the steps of floating on water a transporting ark or casing so constructed as to be openable at its front side and freely submergible and floatable to any desired degree by adjustment of its floatability or buoyancy, drawing a first raft of timbers into the casing while the casing is made to draw deeper by adjustment of the buoyancy of water pervading both inside and outside of the casing, pushing down the raft and fastening it to the bottom of the casing, drawing in the second and third rafts one by one in the same manner as aforementioned while the casing continues drawing deeper by the required degree by further adjustment of the buoyancy of water, pushing said second and third rafts down upon the rafts previously loaded and fastened, fastening them in that place, and by repeating the same operation, piling up said rafts orderly in the transporting casing.

2. The method of loading timbers as claimed in claim 1, in which the hull of a ship is used instead of a transporting ark or a floatable casing.

References Cited

UNITED STATES PATENTS 1,575,070    3/1926    Lewis.
2,682,751    7/1954    Bock _____ 214—12 X

FOREIGN PATENTS 109,849    2/1957    U.S.S.R.

GERALD M. FORLENZA, *Primary Examiner.*

F. E. WERNER, *Assistant Examiner.*

U.S. Cl. X.R.

214—12, 15